Nov. 28, 1944.   G. K. NEWELL   2,363,611
INERTIA OPERATED CONTROL DEVICE
Original Filed April 20, 1940
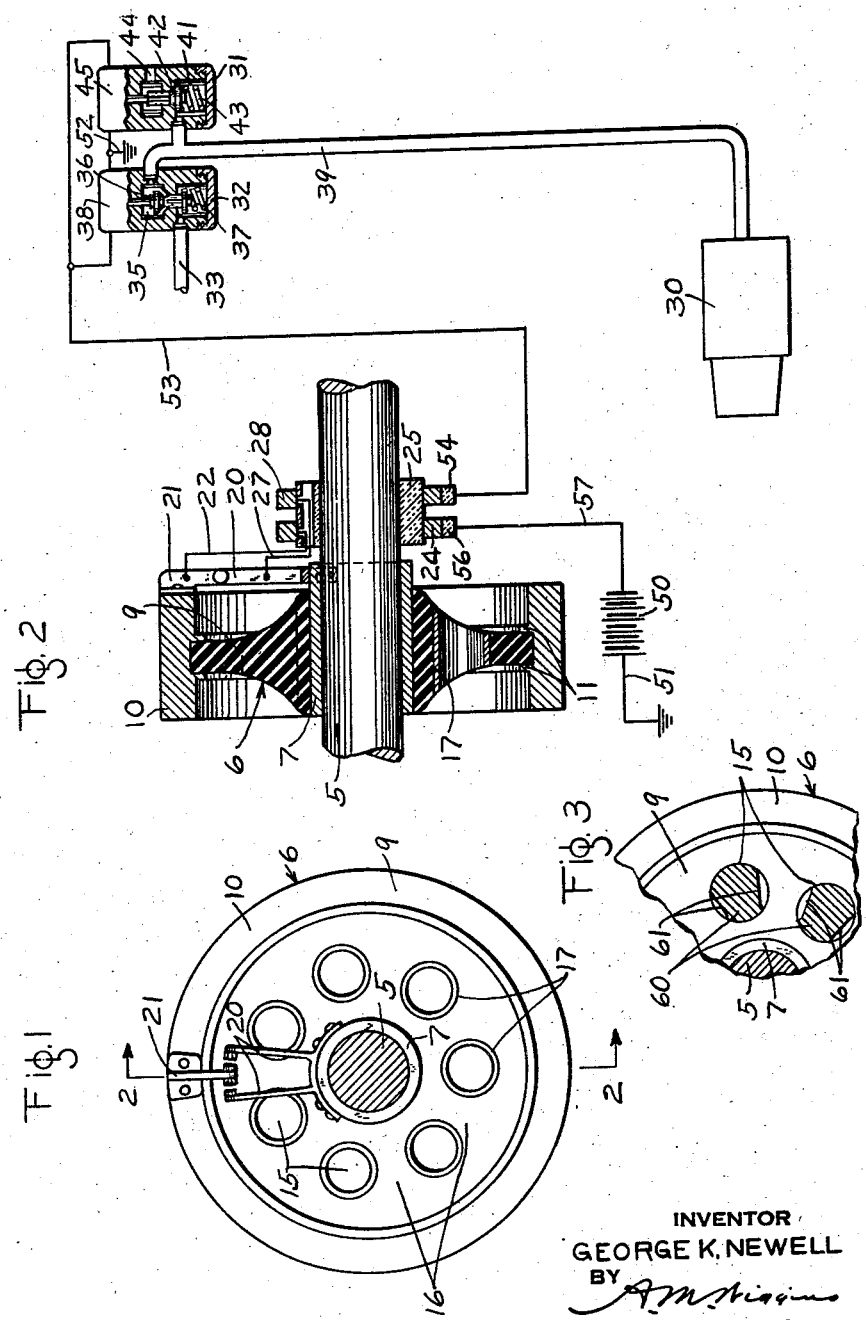
INVENTOR
GEORGE K. NEWELL
BY
ATTORNEY Patented Nov. 28, 1944

2,363,611

UNITED STATES PATENT OFFICE 2,363,611

INERTIA OPERATED CONTROL DEVICE

George K. Newell, near Pitcairn, Pa., assignor to The Westinghouse Air Brake Company, Wilmerding, Pa., a corporation of Pennsylvania Original application April 20, 1940, Serial No. 330,805. Divided and this application February 3, 1942, Serial No. 429,384

10 Claims. (Cl. 200—52)

This invention relates to inertia operated control devices and more particularly to inertia operated devices of the rotary type adapted to register the rate of change of speed of a rotary element for a desired control purpose, the present application being a division of application Serial No. 330,805, filed April 20, 1940, and assigned to the assignee of the present application.

Rotary inertia operated control devices responsive to the rotative deceleration of a vehicle wheel have been employed previously for the purpose of detecting a slipping condition of the wheel and arranged to cause a rapid release of the brakes associated with the wheel so as to cause restoration thereof to a speed corresponding to vehicle speed before it can decelerate to a locked condition and slide.

The term "slipping condition" as applied herein to a vehicle wheel refers to the rotation of the wheel at a speed greater or less than a speed corresponding to vehicle speed occurring respectively in response to the application of propulsion torque or braking force on the wheel sufficient to exceed the limit of adhesion between wheel and road surface and rail. The term "sliding condition" or "sliding" refers solely to the dragging of a vehicle wheel along the road surface or rail in a locked or non-rotative condition. The two terms are thus distinct in meaning and the difference in their meanings should be borne in mind.

Heretofore known rotary inertia devices employed in brake control equipment comprise essentially a fly-wheel rotatively mounted on bearings and driven through a resilient connection, usually a spring, according to the rotational speed of a shaft on which the fly-wheel is journaled. It has been found that when a rotary inertia device of this type is mounted in direct association with the axle of a wheel truck of a railway car, the constant shock and vibration incident to travel of the car along the rails produces a fretting corrosion of the bearings supporting the fly-wheel. This corrosion, in time, increases the bearing friction and consequently interferes with the uniformity of response of the fly-wheel to a given rate of deceleration of acceleration of the vehicle wheel.

It is an object of my present invention to provide a rotary inertia operated control device of novel construction adapted to be employed particularly in railway service for brake control or other purposes which obviates the problem of fretting corrosion of bearings supporting the fly-wheel.

More particularly, it is an object of my invention to provide a rotary inertia operated control device, of the character indicated in the foregoing object, in which the fly-wheel is mounted for rotation with a driving shaft independently of any bearings by means of a flexible resilient annular web portion of rubber or other similar material.

It is another object of my invention to provide a rotary inertia operated control device, of the character indicated in the foregoing objects, in which the resilient web supporting the fly-wheel on the driving shaft or spindle is reinforced in a manner to resist undesired distortion thereof and to limit the degree of rotative movement of the fly-wheel relative to its driving shaft.

Other objects and advantages of the invention will appear in the following more detailed description thereof, taken in conjunction with the accompanying drawing, in which Fig. 1 is a plan view of one form of inertia responsive device constructed in accordance with the invention;

Fig. 2 is a diagrammatic view of an anti-wheel-slider apparatus embodying my improved fly-wheel device, the latter being shown as sectioned substantially along the line 2—2 of Fig. 1; and Fig. 3 is a fragmentary view illustrating another form of fly-wheel device which may be substituted for that shown in Fig. 1.

Referring to Figs. 1 and 2 of the drawing, the anti-wheel-slider mechanism embodying my improved fly-wheel device may comprise a rotary shaft 5, which is operatively connected to a wheel of the vehicle, not shown, and the fly-wheel device 6, which includes a central hub member 7 that is keyed or otherwise secured to the shaft. In addition to the hub member 7 the fly-wheel device 6 includes a flexible web portion 9, which is formed of rubber composition or the like, and is tapered in cross section, as may be seen in Fig. 2, the innermost radial portion of the web member being of greater thickness than the outer radial portion thereof. Supported by the web member 9 in coaxial alignment with the hub member 7 is an annular inertia member 10, the inner surface of which has formed thereon a pair of annular shoulders 11 adapted to grip the outer portion of the web member. It will be understood that the flexible web member 9 is adapted to be firmly secured to the hub member 7 and to the annular inertia member 10 by a suitable bonding means.

Formed in the web member 9 are a plurality of circumferentially spaced apertures 15, which are separated by relatively narrow rib portions 16 and are adapted to receive reenforcing tubular elements 17. By reason of this construction, the fly-wheel member 6 is adapted to permit a relatively large rotary deflection of the inertia member 10 with respect to the hub member 7, the relatively narrow rib portions 16 of the flexible web member being designed to yield readily. On the other hand, the rigid tubular elements 17 are adapted to receive compressive stresses on the relatively broad surfaces thereof for preventing collapse of the rib portions 16 or undue deflection of the inertia member 10 in an axial direction and out of concentric alignment with the hub member 7. It will thus be apparent that the flexible web member 9 is arranged to act as a cushion for the relatively heavy inertia member 10 and to resist displacement of that member with respect to the hub member 7 during rotation of the shaft 5, while the rigid tubular elements 17 in effect constitute bearing rollers imbedded in a viscous bearing race for facilitating rotary displacement of the annular member in response to an angular deflecting force.

Although my improved fly-wheel device may be employed for actuating various types of brake controlling mechanism and the like, it is in the present embodiment arranged to control a switch mechanism comprising a pair of flexible contact elements 20, which are connected together and are mounted on the hub member 7, and an intermediate contact element 21 secured to the annular inertia member 10 and extending into operative alignment with the contact elements 20. As is shown in Fig. 2, the contact element 21 is connected by a conductor 22 to a slip ring 24 that is secured to an insulating member 25 carried by the shaft 5, and the two contact elements 20 are similarly connected by means of a conductor 27 to a slip ring 28, also mounted on the insulating member.

Any desired type of fluid pressure brake apparatus may be arranged for control by the inertia responsive device already described, but for illustrative purposes I have shown only certain essential elements of a brake apparatus, including a brake cylinder device 30 which is operative when supplied with fluid under pressure to exert braking force on the wheel associated with the fly-wheel device 6, a release magnet valve device 31, a cut-off magnet valve device 32, and a fluid pressure supply pipe 33, which is adapted to be supplied with fluid under pressure by operation of a brake controlling valve device, not shown, when an application of the brakes is being effected.

The cut-off valve device 32 is interposed between the supply pipe 33 and the brake cylinder device 30 and comprises a casing having formed therein a valve chamber 35 containing a valve 36 that is normally held in unseated position by the force of a coil spring 37 and is arranged for movement to seated position upon energization of a magnet 38. The valve chamber 35 communicates at all times through a pipe 39 with the brake cylinder device 30, and with the valve 36 unseated also communicates with the supply pipe 33.

The vent valve device 31 comprises a casing having a valve chamber 41 communicating with the pipe 39 and containing a valve 42, which is normally held in seated position by the force of a coil spring 43, and is movable to an unseated position for connecting the chamber 41 to an atmospheric exhaust port 44 in response to energization of a magnet 45.

When the vehicle carrying the apparatus shown in Fig. 2 is in operation, the shaft 4 and fly-wheel device 6 are rotated at a speed corresponding to the rotative speed of the associated wheel of the vehicle. To effect an application of the brakes, the operator causes operation of the usual brake controlling valve equipment, not shown, to initiate supply of fluid under pressure to the supply pipe 33, from which fluid flows past the open valve 36 and through pipe 39 to the brake cylinder device 30, which responds to the increase of fluid pressure to apply braking force to the wheel. If the wheel is braked too heavily, and is thereby caused to decelerate at an excessive rate likely to result in sliding of the wheel, the consequent sudden reduction in the rotative speed of the shaft 5 and of the hub member 7 carried thereby is effective to cause the heavy annular member 10 of the fly-wheel device 6 to overtravel the hub member due to its inertia, while the flexible web element 9 is correspondingly distorted.

As the annular member 10 is thus yieldingly deflected with respect to the hub member 7 of the fly-wheel device, the contact element 21 is carried into engagement with one or the other of the connected contact elements 20, depending upon the direction of rotation of the fly-wheel device, thereby establishing a circuit which includes the positive terminal of a battery 50, a grounded conductor 51, a grounded conductor 52, the coils of the magnets 38 and 45, a conductor 53, a brush 54 engaging the slip ring 28, the conductor 27, the connected contact elements 20 and 21, the conductor 22, the slip ring 24, a brush 56 in contact therewith, and a return conductor 57 leading to the negative terminal of the battery.

Upon energization of the magnet 38 the valve 36 is shifted to its seated position against the force of the spring 37, thereby cutting off further flow of fluid under pressure from the pipe 33 to the brake cylinder device 30. At the same time, as the magnet 45 becomes energized, the valve 42 is forced downwardly and away from its seat to effect venting of fluid under pressure from the brake cylinder device 30 by way of the pipe 39 and the port 44. The braking force exerted by the brake cylinder 30 is thus rapidly reduced and the slipping wheel or wheels accordingly cease to decelerate and begins to accelerate rapidly back toward a speed corresponding to vehicle speed without reducing in speed to a locked condition and sliding.

As the slipping wheels accelerate back toward a speed corresponding to vehicle speed the annular inertia member 10 shifts from an overrunning to a lagging position with respect to the driving shaft 5, thereby causing the contact element 21 to be shifted from engagement with one of the contact elements 20 into contact with the opposite contact element 20. The circuit for energizing the magnet windings 38 and 45 is thus momentarily interrupted during the transitionary period from deceleration to acceleration of the slipping wheel. The magnet windings 38 and 45 are however connected in parallel and are therefore short circuited, as shown, and due to the inherent inductance thereof remain energized sufficiently long to prevent a change of position of the valves 36 and 42 during the transition from deceleration to acceleration of the slipping wheels. Even though the valves 36 and 42 should be momentarily restored to the normal position thereof as shown in the drawing upon the momentary interruption of the circuit for energizing the magnet windings 38 and 45, fluid under pressure would be supplied only momentarily from the supply pipe 33 to the pipe 39 and connected brake cylinder 30, after which such fluid under pressure would again be exhausted upon completion of the circuit in response to the acceleration of the slipping wheels.

When the slipping wheels having a driving connection with the shaft 5 cease to accelerate at a sufficiently rapid rate, the inherent resiliency of the web element 9 restores the annular inertia member 10 to its normal position with respect to the hub member 7. Contact element 21 is thus once more centered between and out of contact with the contact elements 20, thereby interrupting the circuit of the magnet windings 38 and 45. Valves 36 and 42 are thus restored to their unseated and seated positions respectively, in which the exhaust of fluid under pressure from the brake cylinder 30 is terminated and fluid under pressure is resupplied to the brake cylinder to effect reapplication of the brakes.

If, upon reapplication of the brakes, the wheels again begin to slip, the above cycle of operation is repeated.

In Fig. 3 of the drawing, the fly-wheel device 6 is illustrated in slightly modified form, it being understood that the device, although shown in a fragmentary view, is adapted to form part of a brake control system such as that shown in Fig. 2. The elements of the fly-wheel device in Fig. 3 are the same as those of the 6 shown in Fig. 1, and include the shaft 5, the hub member 7, the flexible web element 9, and the annular inertia member 6, but it will be observed that the spaced apertures 15 formed in the web element are fitted with plug elements 60 in place of the cylindrical elements 17 shown in Fig. 1. Each of the plug elements 60 is generally circular in form for insuring a close fit with the corresponding aperture 15, and is provided with oppositely disposed flat surfaces or recesses 61 defining relatively narrow open spaces in the web element 9. It will be apparent that when the web element 9 is distorted due to overtravel of the annular inertia member 10 with respect to the hub member 7, the open spaces adjacent the surfaces 61 of the plug elements are adapted to receive the flexible material of the web element that is temporarily distorted out of the normal position, so that the fly-wheel device 6 is thus rendered freely deflectable in a rotary direction. At the same time the plug elements 60 are effective to prevent undesired collapse or undue distortion of the web element 9, such as might permit displacement of the annular inertia member 10 out of concentric alignment with the hub member 7.

While I have shown my rotary inertia operated control device in connection with a brake control equipment, it will be apparent that it may be employed in connection with a propulsion control apparatus or merely for signal purposes. In any event, the particular construction which I have provided avoids heretofore encountered difficulties incidental to bearing mounted fly-wheels in rotary inertia devices as well as complex spring driving mechanism associating the fly-wheel and its driving shaft.

Having now described my invention, what I claim as new and desire to secure by Letters Patent, is:

1. An inertia operated device comprising, in combination, a rotatable member subject to rapid changes in the rotational speed thereof, a body having a pronounced inertia characteristic, a resilient deformable means supporting said body on said member and arranged to rotate said body and member together and effective to permit said body to move rotatively relative to said member upon sudden changes in speed of rotation of said member, and a control mechanism governed by the relative rotative movement between said body and member.

2. A rotary inertia operated control device for detecting the rate of change of speed of a rotary element, said device comprising a member rotatable according to the speed of the rotary element, an annular inertia element, an annular member of resilient deformable material interposed between said rotatable member and annular element for supporting said annular element in concentric relation to the rotatable member and yieldingly deformable to permit limited rotative movement of the annular element with respect to said rotary member, and means operated in response to the rotative movement of the annular element with respect to the rotary member.

3. A rotary inertia operated control device for detecting the rate of change of speed of a rotary element, said device comprising a member rotatable according to the rotation of said rotary element, an annular inertia element, an annular member of resilient deformable material interposed between said rotatable member and said inertia element and secured respectively thereto effective to normally support said annular element in concentric relation and in a given rotary position with respect to said rotatable member as long as said rotary element rotates at a constant speed and effective to permit limited rotative movement of the annular element in opposite directions with respect to the rotatable member in response to changes in the speed of the rotary element, and switch means operated in response to predetermined rotative movement of the annular element in either direction out of its normal rotative position with respect to the rotatable member.

4. A rotary inertia operated control device for detecting the rate of change of speed of a rotary element, said device comprising a hub element driven according to the rotation of the rotary element, an annular inertia member, an annular web member of rubber-like material secured to the hub element and to said annular member and normally supporting said annular member in concentric relation and in a certain normal rotative position with respect to the said hub member, said web member being torsionally yieldable to permit limited rotary movement of said annular member relative to said hub element in accordance with the rate of change of speed of the rotary element, and means operated in response to a predetermined rotative displacement of said annular member relative to said hub element.

5. A rotary inertia operated control device for detecting the rate of change of speed of a rotary element, said device comprising a hub element driven according to the rotation of the rotary element, an annular inertia member, an annular web member of resilient rubber-like material having a thick central portion secured to said hub element and tapering radially in cross section to a relatively thin peripheral portion which is secured to said annular inertia member, said web member being effective to support said annular inertia member normally in concentric relation and in a certain normal rotative position with respect to said hub element and being torsionally yieldable to permit limited rotative movement of said annular inertia member in either direction out of its certain normal rotative position with respect to said hub element in response to changes in the speed of rotation of said rotary element, and means operated in response to a predetermined displacement of the annular inertia member out of its normal rotative position with respect to said hub element.

6. A rotary inertia operated control device for detecting the rate of change of speed of a rotary element, said device comprising a hub element driven according to the rotation of the rotary element, an annular inertia member, an annular web member of resilient rubber-like material secured to said hub element and said annular inertia member in interposed relation therebetween for supporting said annular inertia member in concentric relation to the hub element and in a certain normal rotative position with respect thereto, said web member being torsionally yieldable to permit rotative movement of said annular inertia member relative to said hub element in response to changes in the rotational speed of the rotary element, reinforcing means associated with said web member for assisting said web member in maintaining the concentricity of the annular inertia member with respect to the said hub element and at the same time being effective to limit the rotary displacement of the annular inertia member with respect to the hub element, and means operated in response to the rotative movement of the annular inertia member with respect to the hub element.

7. A rotary inertia operated control device for detecting the rate of change of speed of a rotary element, said device comprising a hub element driven according to the rotation of the rotary element, an annular inertia member, an annular web member of resilient material secured in interposed relation to said hub element and said annular inertia member for supporting said annular inertia member in concentric relation and in a certain normal rotative position with respect to the said hub element, said web member being torsionally yieldable to permit rotative movement of the annular inertia member with respect to the said hub element in response to the changes in the rotational speed of the rotary element, said web member having a plurality of apertures, cylindrical relatively rigid elements fitted into said apertures for assisting said web member in maintaining the concentricity of the annular inertia member with respect to the hub element and effective at the same time to limit the degree of rotative movement of said inertia member with respect to said hub element, and means operatively responsive to the rotative movement of the inertia member with respect to the hub element.

8. A rotary inertia operated control device for detecting the rate of change of speed of a rotary element, said device comprising a hub element driven according to the rotational speed of a rotary element, an annular inertia member, an annular web member of resilient material interposed between and secured to said hub element and inertia member for supporting said annular inertia member in concentric relation to the hub element and in a certain rotative position with respect thereto and being torsionally yieldable to permit the rotative movement of the inertia member with respect to the hub element in response to changes in the rotational speed of the rotary element, said web having a plurality of circular apertures therein, a plurality of substantially cylindrical plug elements fitted into said apertures whereby to assist said web member in maintaining concentricity of the inertia member with respect to the hub element and effective also to limit the rotative movement of the inertia member with respect to the hub element, and means operated in response to the rotative movement of the inertia member with respect to the hub element.

9. A control device comprising a rotary member arranged to be driven at different speeds, a continuous annular member having a pronounced inertia characteristic, resilient annular means interposed between and fixed to said annular member and said rotary member, said resilient annular means being so constructed as to support said annular member in substantially concentric relation to and in a certain rotative position relative to said rotary member and to permit said annular member to torsionally deform it a substantial amount in response to a change in the rotational speed of the rotary member at a rate exceeding a certain rate to thereby cause relative rotational movement of the annular member out of its said certain rotative position with respect to said rotary member, and switch means operatively responsive to relative rotational movement of said inertia member with respect to said rotary member.

10. A circuit controlling device comprising a rotary member operable at varying speeds, an annular element of resilient flexible material having a central hub portion and an outer portion extending radially outward from the hub portion, the hub portion of said annular element being secured to said rotary member with the outer portion in concentric relation to and rotatable in a plane perpendicular to the axis of rotation of said rotary member, an annular member fixed on the periphery of the outer portion of said element and having a pronounced inertia characteristic so as to cause torsional deformation of the outer portion of said element to thereby permit said annular member to shift rotatively a substantial amount with respect to the rotary member upon a sudden change in speed of the rotary member, and switch means operative upon rotational movement of the said annular member with respect to said rotary member.

GEORGE K. NEWELL.